US007007240B1

(12) United States Patent
Anderson et al.

(10) Patent No.: US 7,007,240 B1
(45) Date of Patent: Feb. 28, 2006

(54) METHOD AND SYSTEM FOR DISPLAYING NON-OVERLAPPING PROGRAM AND AUXILIARY WINDOWS

(75) Inventors: Glen J. Anderson, Sioux City, IA (US); John S. Love, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/365,731

(22) Filed: Aug. 3, 1999

(51) Int. Cl.
*G06K 15/00* (2006.01)
(52) U.S. Cl. ....................... 715/790; 715/705
(58) Field of Classification Search ............... 345/708, 345/705, 1.1, 764, 781, 761, 1.3, 732, 790; 715/790–796, 802, 767, 806, 807, 783
See application file for complete search history.

(56) References Cited

U.S. PATENT DOCUMENTS

| | | | |
|---|---|---|---|
| 4,360,345 A * | 11/1982 | Hon ........................... 434/262 |
| 4,434,419 A | 2/1984 | Couper et al. |
| 4,789,962 A * | 12/1988 | Berry et al. ................. 395/338 |
| 5,157,768 A | 10/1992 | Hoeber et al. |
| 5,287,448 A * | 2/1994 | Nicol et al. ................. 395/337 |
| 5,436,637 A | 7/1995 | Gayraud et al. |
| 5,535,323 A | 7/1996 | Miller et al. |
| 5,602,996 A | 2/1997 | Powers, III et al. |
| 5,621,904 A * | 4/1997 | Elliott et al. ................ 395/342 |
| 5,710,898 A | 1/1998 | Tozuka |
| 5,715,415 A | 2/1998 | Dazey et al. |
| 5,748,189 A | 5/1998 | Trueblood |
| 5,880,731 A * | 3/1999 | Liles et al. .................. 345/349 |
| 5,892,511 A * | 4/1999 | Gelsinger et al. ........... 715/794 |
| 5,920,316 A * | 7/1999 | Oran et al. .................. 715/779 |
| 5,923,307 A * | 7/1999 | Hogle, IV .................... 345/4 |
| 6,011,537 A * | 1/2000 | Slotznick .................... 715/733 |
| 6,018,340 A * | 1/2000 | Butler et al. ................. 345/339 |
| 6,104,359 A * | 8/2000 | Endres et al. ................ 345/3 |
| 6,262,730 B1 * | 7/2001 | Horvitz et al. .............. 715/707 |
| 6,618,477 B1 * | 9/2003 | Lambiase .............. 379/265.02 |
| 6,789,251 B1 * | 9/2004 | Johnson ...................... 717/100 |

OTHER PUBLICATIONS

The American Heritage Dicitonary, 2nd College Edition, pp. 232 ,234 and 373 (1982).*

* cited by examiner

*Primary Examiner*—Steven P. Sax
(74) *Attorney, Agent, or Firm*—Scott Charles Richardson; Olds, Maier & Richardson, PLLC

(57) ABSTRACT

When a user wants to display application program status information or invoke a help function (either manually or automatically), a context-sensitive status or help display is provided that is either physically or virtually separate from the application program display. That is, the status or help display does not conceal or otherwise interfere with the main output of the application program. With this arrangement, the user is not inconvenienced by invoking a status request or help functions, nor is the user distracted by its display. The status or help information may be displayed in a portion of a single screen that does not overlap with the active window of the application program (a virtually separate display). Alternatively, a physically separate auxiliary display may be provided for display of the status or help information.

22 Claims, 2 Drawing Sheets

METHOD AND SYSTEM FOR DISPLAYING NON-OVERLAPPING PROGRAM AND AUXILIARY WINDOWS

BACKGROUND OF THE INVENTION

1. Field of the Invention

The present invention relates to displays for status or "help" information in computer application programs. More specifically, the invention relates to status or help displays that are presented so as not to overlap with windows of the application program to which the status or help display pertains.

2. Related Art

Many commercially-available application programs have on-line help functions that allow a user to access a data base of context-sensitive help information. Conventionally, a user must manually invoke the help function, such as by clicking a mouse on a help menu item or help icon, or pressing the F1 key. When invoked, the conventional help function causes a help window to be displayed that conceals some or all areas of interest on the software application from which the help function was invoked.

This concealment makes it necessary for the user to move or resize one or both of the application window and the help window, and/or repeatedly change the focus between windows to select which is the active window. Especially because help functions are often invoked by novices, this moving and resizing of windows distracts from the learning process. In any event, it can be frustrating and time-consuming to all users.

Moreover, the mere invocation of a help function may be distracting to some users. Indeed, some users having difficulty using an application program may not even be aware of, or think of, invoking the help function. In this event, the user is not even reminded that help is easily available for a given function.

More generally, in addition to help functions, it is often desirable to provide status information concerning an application program that is being executed. However, conventional display of such status information has suffered from the same shortcomings as the display of help information as described above.

Accordingly, there is a need in the art to provide status information and/or context-sensitive help that is easily and naturally invoked, and that does not conceal or otherwise interfere with the user's view of the application program. It is to meet at least these needs that the present invention is directed.

SUMMARY OF THE INVENTION

When a user wants to display application program status information or when the user invokes a help function, either manually or automatically, the present invention provides a context-sensitive status or help display that is either physically or virtually separate from the application program display. That is, the status or help display does not conceal or otherwise interfere with the main output of the application program. With this arrangement, the user is not inconvenienced by invoking a status request or help functions, nor is the user distracted by its display.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
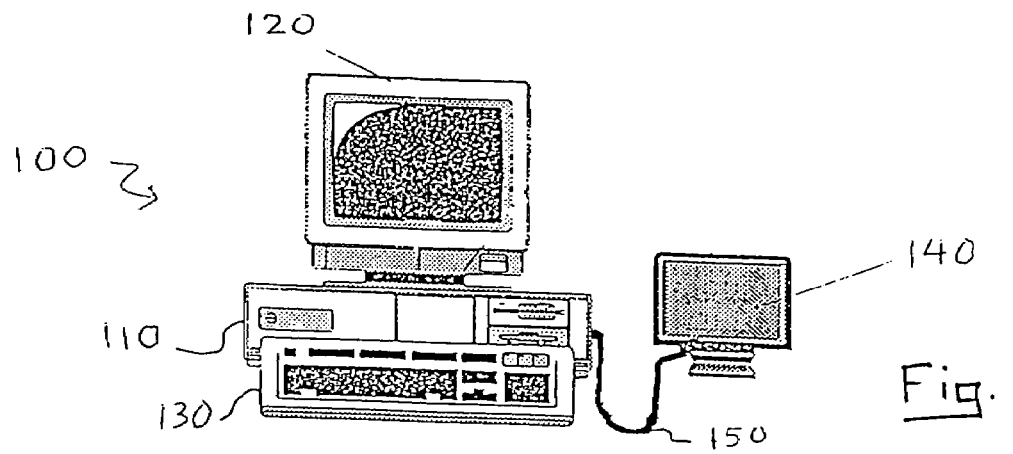
FIG. 1 shows a computer system according to a first embodiment of the present invention, in which a physically separate display of intercepted status or help information is provided.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a computer system 100 according to a first embodiment of the present invention, in which a separate physical display of intercepted status or help information is provided. The system includes a computer chassis 110 connected to a main display 120 and a keyboard 130. Significantly, an auxiliary display 140 functions as a status or help display that is connected to the chassis by, for example, a universal serial bus (USB) connection 150. All such individual elements may be of conventional design, although their arrangement and operation together are distinguished from known systems. Preferably, the auxiliary display 140 is implemented as a physically smaller and less expensive display, such as a monochrome liquid crystal display (LCD). However, it is understood that the auxiliary display may be of equal or higher display quality to the main display if so desired.

In operation, the main display 120 displays the windows of an application program. When a status request or help function is invoked, either explicitly or automatically, the inventive system intercepts such request or invocation and diverts the status or help window to the auxiliary display 140. The inventive arrangement prevents the status or help window from being displayed on the main display 120, thereby ensuring that the status or help window does not obscure or otherwise interfere with the presentation of the application program. The user views the application display and the auxiliary display simultaneously on the two physically separate displays 120 and 140.

Figure 2:
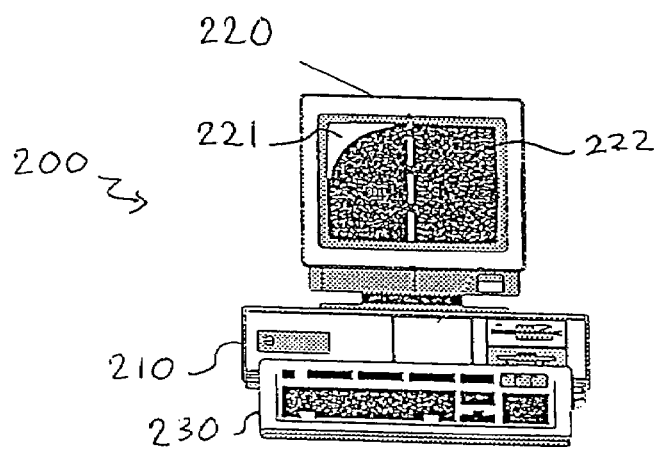
FIG. 2 shows a computer system according to a second embodiment of the present invention, in which an integrated physical display of intercepted status or help information is provided.

FIG. 2 shows a computer system 200 according to a second embodiment of the present invention, in which an integrated physical display of intercepted help information is provided. The system includes a computer chassis 210 connected to a display 220 and a keyboard 230. As in the first embodiment, all such individual elements may be of a hardware design that is basically conventional, although their operation together is distinguished from known systems.

In the FIG. 2 embodiment, display 220 displays applications programs in a conventional manner. However, when a status request or help function is invoked, either explicitly or automatically, display 220 is made to include first and second regions 221 and 222, respectively. First region 221 remains dedicated to the display of the application program window. However, second region 222 is dedicated to display of the status or help window. Second region 222 can be considered to be a virtual help display that performs the same function as the physically separate help display 140 in the FIG. 1 embodiment.

The structure of two exemplary embodiments of the invention having been described above, following is a description of their operation.

Figures 3A, 3B:
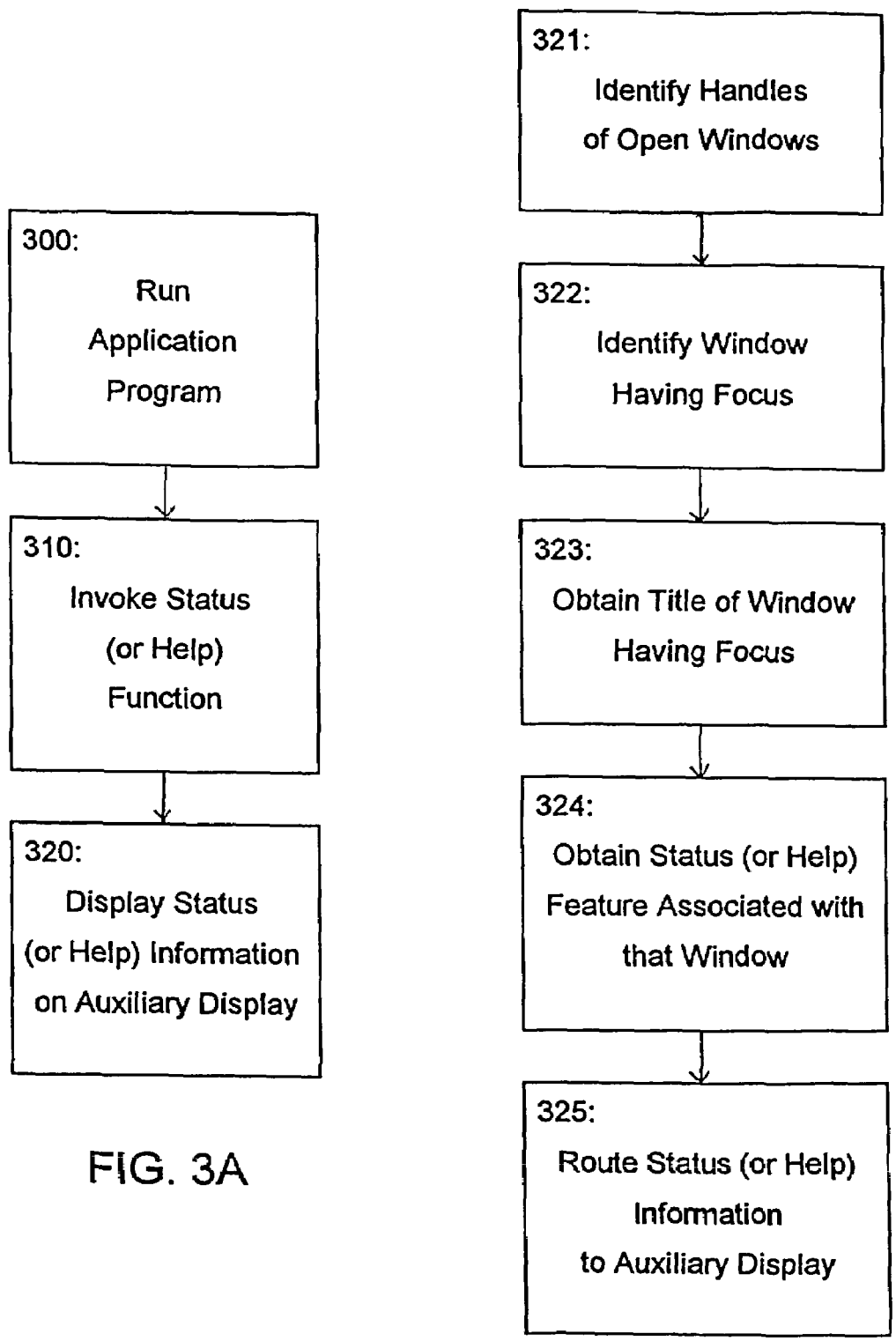
FIGS. 3A and 3B are a flow charts schematically illustrating operation of embodiments of the present invention, with FIG. 3B showing details of a particular step in FIG. 3A.

FIG. 3A is a high-level flow chart schematically illustrating operation of embodiments of the invention. Block 300 indicates the running of an application program in a conventional manner. During this operation, the application program's windows are displayed on display 120 (FIG. 1) or 220 (FIG. 2).

Block 310 indicates invocation of the application's status request or help function. This invocation may be by explicit user request, such as pressing on the F1 key or clicking on a help menu item or help icon. Alternatively, according to the invention, this invocation of the status request or help function can be made automatically. The status request or help function that is invoked is made context-sensitive by determining which window is the "active" window (the window that "has focus"). The manner in which these functions are performed is described with reference to FIG. 3B.

Finally, block 330 indicates the display of the appropriate status or help window on auxiliary display 140 (FIG. 1) or on virtual display 222 of physical display 220 (FIG. 2). At this time, the user views the application window and the status or help window simultaneously without conflict.

FIG. 3B illustrates an exemplary manner in which the help function is invoked, and in which the help information is prepared for sending to the physical or virtual auxiliary help display. Block 321 indicates use of the WINDOWS API Enum Windows function to identify handles of windows that are open. With the knowledge of which windows are open at a given time, block 322 indicates the identification of which window is the active window (the window that "has focus"). Block 323 indicates use of the identified focus window information to obtain title of the window that has focus.

Given the title of the window that has focus, block 324 indicates the actual activation of the on-line status or help feature associated with that window tide, and retrieval of the corresponding information. Finally, block 325 indicates the directing of the on-line status or help information to the physical or virtual auxiliary display.

The process of monitoring active windows, identifying focus windows and determining their titles for retrieval and routing of help information to the auxiliary display can be an ongoing process. That is, the functions of blocks 321 through 325 can be repeated with each opening or closing of windows, or with each change in which window has focus. As a particular example, the inventive arrangement generates a simulated F1 key closure to retrieve the proper status or help information as part of block 324. This ongoing process enables an embodiment in which the online status or help is continuously and automatically updated for the user, based solely on the user's navigation through the windows of the application program. In this embodiment, the user does not have to explicitly invoke the status request or help function by pushing F1 or clicking on a help menu item or help icon.

The preferred embodiment of the invention makes use of the basic ability for an application program to send certain windows to specific displays that is available in the MICROSOFT® WINDOWS® operating system as "multi-monitor support." That operating system includes the ability to provide independent displays as well as "large desktops." Independent displays generally involve display of windows on respective display devices, whereas large desktops involve a single window that is split across more than one display device. The independent display is more applicable to the present invention than the large desktop because the invention primarily envisions separate display of the application's main window and the status or help window. However, use of the invention with the large desktop is of course not precluded.

Advantageously, the invention's use of the multimonitor support allows the different monitors to have their own resolutions and color depths. This variety allows, for example, a higher-resolution monitor to be used for the application's main window and a less expensive lower-resolution monitor (such as a monochrome LCD display with a thin form factor) to be used for the auxiliary display.

Figure 4:
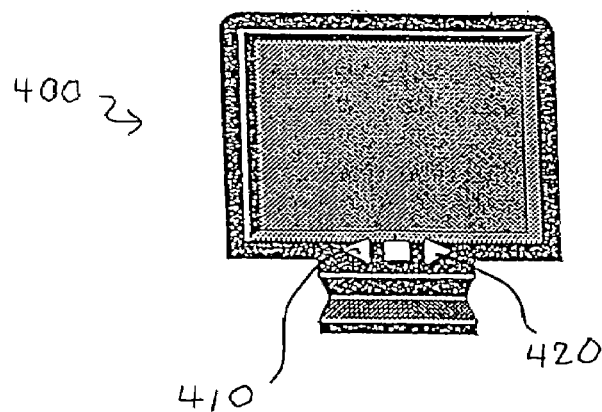
FIG. 4 schematically illustrates an alternative embodiment of an auxiliary help display that has its own integrated controls for controlling display of the help windows.

FIG. 4 schematically illustrates an alternative embodiment of an auxiliary help display 400 that has its own integrated controls for controlling display of the help windows. Display 400 is shown schematically with integrated BACK control 410 and FORWARD control 420 that allow a user to move between previously-displayed status or help windows and to return to a currently-displayed status or help window.

Modifications and variations of the above-described embodiments of the present invention are possible, as appreciated by those skilled in the art in light of the above teachings. For example, the type of information sent to the auxiliary display need not be limited to conventional help information, but may be any status or other information desired. Further, varying the number, type and arrangement of displays lies within the contemplation of the present invention. It is therefore to be understood that, within the scope of the appended claims and their equivalents, the invention may be practiced otherwise than as specifically described.

What is claimed is:

1. A computer system comprising:
    means for intercepting a non-context-sensitive user request for auxiliary information;
    means for determining an active window from among one or more open windows, the active window displaying an application program output of an application program;
    means for making the user request context-sensitive and associating the auxiliary information with the application program based on the determination the active window;
    first display means having a predetermined first display area dedicated to displaying of an application program output;
    second display means having a predetermined second display area dedicated to displaying auxiliary information related to the application program; and
    means, responsive to the application program, for separately routing the application program output exclusively to the first display area and the auxiliary information exclusively to the second display area so that display of the auxiliary information never overlaps or conceals display of the application program output.

2. The system of claim 1, wherein:
the routing means includes a multimonitor support feature inherent in an operating system of the computer system.

3. The system of claim 1, wherein:
the auxiliary information is help information from a help information data base included in the application program.

4. The system of claim 1, wherein:
the first and second display means constitute different portions of a screen on a single display device.

5. The system of claim 1, wherein:
the first and second display means constitute respective first and second physically separate display devices.

6. The system of claim 5, wherein:
the second display device is physically smaller than the first display device.

7. The system of claim 5, wherein:
the second display device has a lower resolution than the first display device.

8. The system of claim 1, wherein:
the routing means routes the auxiliary information to the second display means in response to the intercepting means' interception of the user request.

9. The system of claim 8, wherein:
the user request is an invocation of a help function in the application program; and
the routing means constitutes means for routing help information from a help data base in the application program to the second display means.

10. The system of claim 1, wherein:
the system further comprises means for continually monitoring an active window in the application program; and
the routing means constitutes means for automatically routing to the second display means, auxiliary information that corresponds to a window that the monitoring means determines to be the active window.

11. The system of claim 10, wherein the routing means constitutes:
means for automatically routing to the second display means, help information that corresponds to a window that the monitoring means determines to be the active window.

12. A method for displaying auxiliary information to prevent overlap with display of an application program output associated with an application program, the method comprising the steps of:
intercepting a non-context-sensitive user request for the auxiliary information;
determining an active window from among one or more open windows, the active window displaying the application program output;
making the user request context-sensitive and associating the auxiliary information with the application program based on the determination of the active window;
routing and displaying the application program output to a first dedicated display area that does not display the auxiliary information; and
separately routing the auxiliary information to a second dedicated display area that does not display the application program output, so that display of the auxiliary information never overlaps or conceals display of the application program output.

13. The method of claim 12, wherein:
the routing step includes a multimonitor support feature inherent in an operating system of the computer system that executes the application program.

14. The method of claim 12, wherein:
the auxiliary information is help information from a help information data base included in the application program.

15. The method of claim 12, wherein:
the first and second display means constitute different portions of a screen on a single display device.

16. The method of claim 12, wherein:
the first and second display means constitute respective first and second physically separate display devices.

17. The method of claim 16, wherein:
the second display device is physically smaller than the first display device.

18. The method of claim 16, wherein:
the second display device has a lower resolution than the first display device.

19. The method of claim 12, wherein:
the routing step includes routing the auxiliary information to the second display means in response to the interception of the user request.

20. The method of claim 19, wherein:
the user request is an invocation of a help function in the application program; and
the routing step constitutes routing help information from a help data base in the application program to the second display means.

21. The method of claim 12, wherein:
the method further comprises continually monitoring an active window in the application program; and
the routing step constitutes means for automatically routing to the second display means, auxiliary information that corresponds to a window that the monitoring step determines to be the active window.

22. The method of claim 21, wherein the routing step constitutes:
automatically routing to the second display means, help information that corresponds to a window that the monitoring means determines to be the active window.

* * * * *